US012659804B2

(12) United States Patent
Shih et al.

(10) Patent No.: US 12,659,804 B2
(45) Date of Patent: ***Jun. 16, 2026

(54) USER EQUIPMENT AND WIRELESS COMMUNICATION METHOD FOR NETWORK SLICING

(71) Applicant: FG Innovation Company Limited, Tuen Mun (HK)

(72) Inventors: Mei-Ju Shih, Taipei (TW); Chie-Ming Chou, Taipei (TW); Yung-Lan Tseng, Taipei (TW); Chia-Hung Wei, Taipei (TW)

(73) Assignee: NEW RADIO LLC, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,300

(22) Filed: Apr. 21, 2021

(65) Prior Publication Data

US 2021/0243653 A1 Aug. 5, 2021

Related U.S. Application Data

(63) Continuation of application No. 15/939,779, filed on Mar. 29, 2018, now Pat. No. 11,026,121.

(Continued)

(51) Int. Cl.
*H04W 28/16* (2009.01)
*H04W 48/14* (2009.01)
(Continued)

(52) U.S. Cl.
CPC ........... *H04W 28/16* (2013.01); *H04W 48/14* (2013.01); *H04W 76/10* (2018.02); *H04W 88/06* (2013.01)

(58) Field of Classification Search
CPC ..... H04W 48/14; H04W 28/16; H04W 76/10; H04W 88/06
See application file for complete search history.

(56) References Cited

U.S. PATENT DOCUMENTS

2013/0156010 A1* 6/2013 Dinan .................. H04B 7/0417
370/335
2016/0352734 A1 12/2016 Senarath et al.
(Continued)

FOREIGN PATENT DOCUMENTS

WO 2016192636 12/2016

OTHER PUBLICATIONS

Nokia, Alcatel-Lucent Shanghai Bell, Samsung, ZTE, CATT, "Solution for Selection of Network Slice and CN entity", R3-161861, 3GPP TSG-RAN WG3 Meeting #93, Gothenburg, Sweden, Aug. 22-26, 2016.
(Continued)

*Primary Examiner* — Mandish K Randhawa
(74) *Attorney, Agent, or Firm* — ScienBiziP, P.C.

(57) ABSTRACT

A wireless communication method performed by a user equipment (UE) is provided. The wireless communication method includes transmitting, to a first base station, a radio resource control (RRC) message indicating a requested network slice, the RRC message including a UE identifier (ID) and single network slice selection assistance information (S-NSSAI); receiving, from the first base station, a network slice response indicating the requested network slice is rejected and a cause of the rejection; and establishing a first RRC connection with the first base station.

11 Claims, 11 Drawing Sheets

Related U.S. Application Data

(60) Provisional application No. 62/478,133, filed on Mar. 29, 2017.

(51) Int. Cl.
  *H04W 76/10* (2018.01)
  *H04W 88/06* (2009.01)

(56) References Cited

U.S. PATENT DOCUMENTS

| | | | | |
|---|---|---|---|---|
| 2017/0359768 | A1* | 12/2017 | Byun | H04W 8/06 |
| 2018/0049267 | A1* | 2/2018 | Chen | H04W 76/27 |
| 2018/0270744 | A1* | 9/2018 | Griot | H04W 48/18 |

OTHER PUBLICATIONS

ZTE, "Some Issues with NW Slicing in Multiple Connectivity Contexts", R3-162731, 3GPP TSG RAN WG3 Meeting#94, Reno, USA, Nov. 14-18, 2016.

3rd Generation Partnership Project, Technical Specification Group Services and System Aspects, Study on Architecture for Next Generation System, 3GPP TR 23.799 V14.0.0 (Dec. 2016).

Huawei, HiSilicon, "Slice Availability and Discovery in RAN", R2-1700102, 3GPP TSG-RAN WG2 NR Ad Hoc, Spokane, Washington, USA, Jan. 17-19, 2017.

CMCC, "Beam Related Measurement Report and Inter-cell HO in NR", R2-1700532, 3GPP TSG-RAN WG2 NR Ad Hoc, Spokane, USA, Jan. 17-19, 2017.

Huawei, Solution for Selection of Network Slice and CN entity, 3GPP TSG-RAN WG3 Meeting #93bis, Sophia Antipolis, France, Oct. 10-14, 2016, R3-162460.

ZTE, Some Issues with NW Slicing in Multiple Connectivity Contexts, 3GPP TSG RAN WG3 Meeting#93bis, Sophia-Antipolis, France, Oct. 10-14, 2016, R3-162122.

Huawei, HiSilicon, Measurement and Mobility in high frequency, 3GPP TSG-RAN2 Meeting #Adhoc, Spokane, Washington, USA, Jan. 17-19, 2017, R2-1700166.

ITRI, RAN Slicing in NR, 3GPP TSG RAN WG2 NR Ad Hoc, Spokane, USA, Jan. 17-19, 2017, R2-1700262.

Ericsson, Comments on "Update to section 8.1. Interim Agreements", SA WG2 Meeting #S2-118, Nov. 14-18, 2016, Reno, Nevada, USA, S2-166785.

Apple, A solution of network slice instance selection and association, SA WG2 Meeting #116BIS, Aug. 29-Sep. 2, 2016, Sanya, P.R China, S2-165458.

3GPP TR 38.801, "3rd Generation Partnership Project; Technical Specification Group Radio Access Network; Study on New Radio Access Technology; Radio Access Architecture and Interfaces (Release 14)", V2.0.0 (Mar. 2017).

3GPP TR 38.804, "3rd Generation Partnership Project; Technical Specification Group Radio Access Network; Study on New Radio Access Technology; Radio Interface Protocol Aspects (Release 14)", V14.0.0 (Mar. 2017).

RAN2 Chairman (Intel), "Proposed Agenda", 3GPP TSG-RAN WG2 Meeting #94, Nanjing, China, May 23-27, 2016, R2-163300.

* cited by examiner

<u>300</u>

900

1062 Identify selected PLMN and equivalent PLMNs

1064 Identify the network slice

1066 Search the RAT or frequency bands supporting the network slice

1100

USER EQUIPMENT AND WIRELESS COMMUNICATION METHOD FOR NETWORK SLICING

CROSS REFERENCE TO RELATED APPLICATIONS

This application is a continuation application of U.S. patent application Ser. No. 15/939,779, filed on Mar. 29, 2018, which claims the benefit of and priority to a provisional U.S. Patent Application Ser. No. 62/478,133, filed on Mar. 29, 2017, the contents of all of which are fully incorporated herein by reference.

TECHNICAL FIELD

The present disclosure generally relates to wireless communication methods, and more particularly, to wireless communication methods and systems for network slicing.

BACKGROUND

Currently, an LTE eNB connecting to an Evolved Packet Core (EPC) cannot support a network slice. That is, an LTE eNB does not have service differentiation, and cannot read the network slice specific messages. Furthermore, an NR gNB and an eLTE eNB each have their own network slice capabilities, but the NR gNB and the eLTE eNB may not support all the services. Although LTE-NR tight interworking and network slice are important features of the 5G NR architecture, not all Radio Access Technologies (RATs) in the LTE-NR tight interworking deployments support network slice.

Thus, it is desirable that the network slice can be supported in the standalone case and in the non-standalone case. In the non-standalone case, there may be an LTE eNB serving as an anchor node and connected to an EPC. It is also desirable that the NR gNB/cell that serves either as an anchor node or as a secondary node can support the RAN part of slicing (e.g., RAN part of network slice, via multiple numerologies/Transmission Time Interval (TTI) lengths, RAN part configuration of network slice).

SUMMARY

In one aspect of the present disclosure, a wireless communication method performed by a user equipment (UE) is provided. The wireless communication method includes transmitting, to a first base station, a radio resource control (RRC) message indicating a requested network slice, the RRC message including a UE identifier (ID) and single network slice selection assistance information (S-NSSAI); receiving, from the first base station, a network slice response indicating the requested network slice is rejected and a cause of the rejection; and establishing a first RRC connection with the first base station.

In another aspect of the present disclosure, a UE is provided. The UE includes a processor and a memory coupled to the processor, the memory storing a computer-executable program that when executed by the processor, causes the processor to transmit, to a first base station, an RRC message indicating a requested network slice, the RRC message including a UE ID and S-NSSAI; receive, from the first base station, a network slice response indicating the requested network slice is rejected and a cause of the rejection; and establish a first RRC connection with the first base station.

In yet another aspect of the present disclosure, a wireless communication method is provided. The wireless communication method includes receiving, by a first base station, an RRC message indicating a requested network slice from a UE, the RRC message including a UE ID and S-NSSAI; transmitting, by the first base station, a network slice response to the UE, the network slice response indicating the requested network slice is rejected and a cause of the rejection; and establishing a first RRC connection between the first base station and the UE.

DETAILED DESCRIPTION

Figure 1:
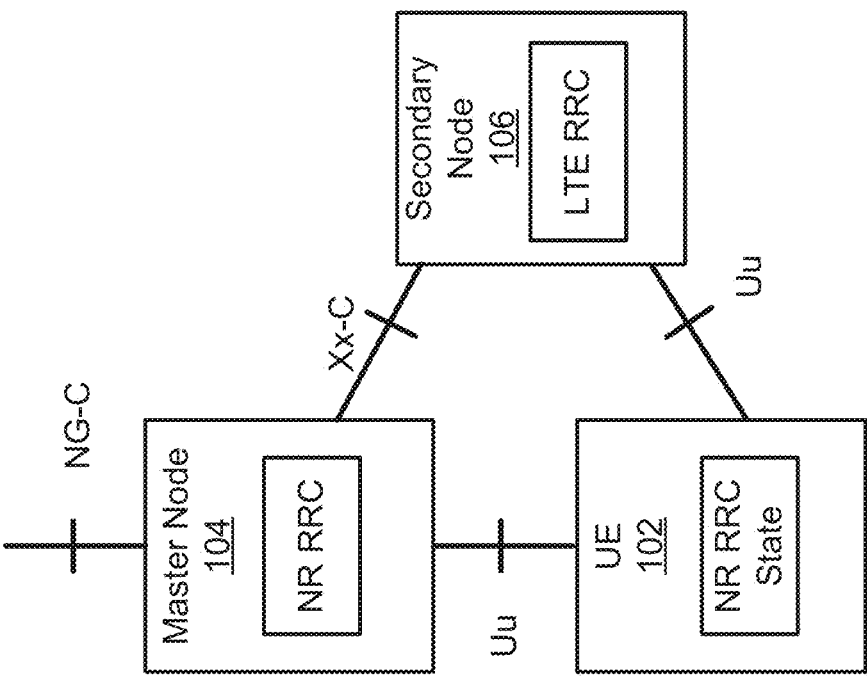
FIG. 1 is a diagram illustrating control plane architectures for LTE-NR Tight Interworking.
Figure 1:
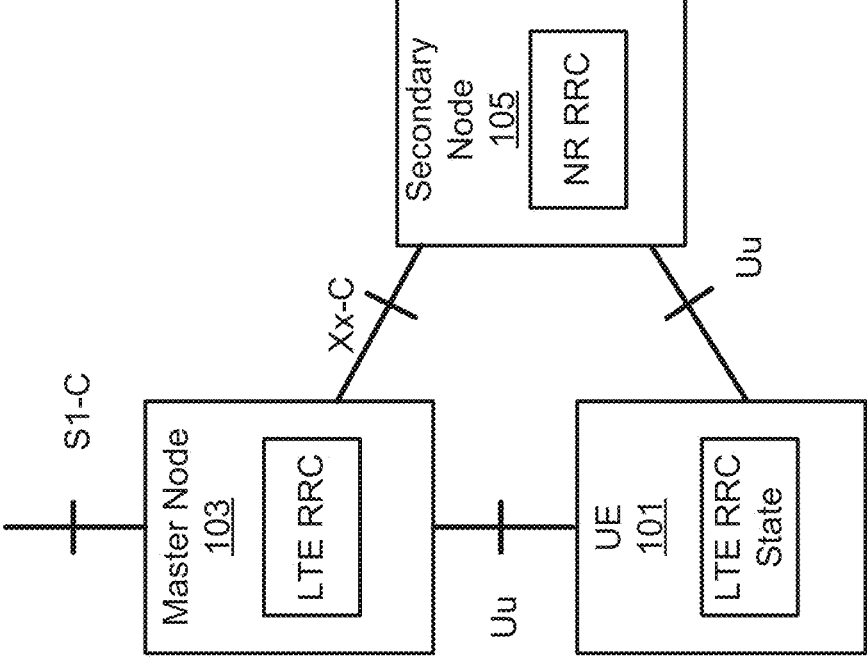

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

It is noted that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, part or section. Thus, a first element, component, region, part or section discussed below could be termed a second element, component, region, part or section without departing from the teachings of the present disclosure.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a radio network controller (RNC) as in the UMTS, a base station controller (BSC) as in the GSM (Global System for Mobile Communication)/GERAN (GSM EDGE (Enhanced Data Rate for GSM Evolution) Radio Access Network), a ng-eNB as in an Evolved Universal Terrestrial Radio Access (E-UTRA) base station in connection with the 5G Core Network (5GC), a next generation node B (gNB) as in the 5G Access Network (5G-AN), and any other apparatus capable of controlling radio communication and managing radio resources within a cell. The base station may connect to serve the one or more UEs through a radio interface to the network.

In the present disclosure, it is assumed that the EPC does not support network slice, while the NGC (e.g., 5G-CN and 5GC) supports network slice. When the CN is a 5G-CN, the CN can support the storage and selection of network slice. For example, a 5G-CN stores the network slice information of each registered NR cell and eLTE cell. The 5G-CN may also select the proper NR cell and eLTE cell for the UE's network slice request. However, the eLTE eNB (e.g., ng-eNB) and the NR gNB may not support all network slices/services defined by the core network. The NR gNB/cell may support RAN part of slicing from Radio Resource Control (RRC) layer through Service Data Adaptation Protocol (SDAP) layer to Physical (PHY) layer (e.g., via different numerologies/TTI lengths).

It is noted that the capabilities of network slice supported by each cell may be different. However, the eLTE eNB and/or NR gNB may not have the capability to support all network slices/services defined by the core network. The capabilities of these network entities are summarized in Table 1. It is noted that the network slices/services supported by RATs may be a subset of the network slices supported by the CN.

TABLE 1

Network Slice Capability of Different Network Entities

| | Radio Access Technology | | | Core Network | |
|---|---|---|---|---|---|
| | NR | ng-eNB | LTE | | |
| | gNB | (eLTE eNB) | eNB | 5GC | EPC |
| Network Slice | Support | Support | | Support | |

In some implementations of the present disclosure, it is assumed that NR gNBs and eLTE eNBs may generate, read, transmit, receive, or forward network slice related RRC messages. The NR gNBs may further provide RAN part of slicing (e.g., RAN part of network slice, via multiple numerologies/TTI lengths, RAN part configuration of network slice) to support different network slices/services.

There are several cases where a UE may need assistance to connect to a suitable node that supports the UE's specific network slice(s) and/or service(s). For example, when a UE performs initial access, the UE may connect to a master node that cannot support its network slice/service requirement. In another case, even after the UE performs initial access and connects to a suitable master node that supports its initial network slice, the master node may become unsuitable when the UE changes/updates the initial network slice to another different network slice due to the running applications. In another case, if a UE needs a certain network slice under LTE-NR tight interworking where the current secondary node NR gNB cannot provide the certain network slice, the UE may turn to another suitable secondary node for supporting the network slice. Exemplary embodiments of the present disclosure describe various methods/mechanisms for ensuring a UE connect to a suitable node that supports the UE's specific network slice(s) and/or service(s). A suitable node(s) are the node(s) suitable for supporting a requested network slice/service from a UE, such as NR gNB(s)/cell(s) and ng-eNB(s)/cell(s).

In addition, when a UE is configured with LTE-NR interworking, which includes many deployment scenarios, it is important to make sure that the UE connects to a suitable/appropriate RAT, which can support the UE's desired network slice/service. For example, the UE may be suggested to camp to an appropriate RAT that can support its service during cell selection/reselection. For example, when the UE is in RRC CONNECTED state and needs new network slice/service, the UE may be suggested to connect to an appropriate RAT, which can further support the UE's new network slice/service requirement.

It is noted that the cell ID and base station ID in the present disclosure can refer to an NR gNB ID, NR cell ID, ng-eNB ID, eLTE cell ID, LTE eNB ID, LTE cell ID, global unique base station ID (e.g., PLMN ID plus eNB ID for LTE), unique base station ID in a PLMN (e.g., eNB ID for LTE), NR/E-UTRAN Cell Identity (e.g., eNB ID plus cell ID for LTE), global NR/E-UTRAN Cell Identity (e.g., PLMN ID plus eNB ID plus cell ID for LTE), and/or PCI (Physical Cell Identifier) derived from PSS (Primary Synchronization Signals) and/or SSS (Secondary Synchronization Signals).

Furthermore, in some embodiments, a base station may integrate some of core network functions, such as Mobility Management Entity (MME) of LTE EPC and Access and Mobility Management Function (AMF) of 5GC in cellular network implementations. In some embodiments, a base station, a node, an eNB, or a gNB may refer to a RAT that may or may not integrate the core network functions.

FIG. 1 is a diagram illustrating control plane architectures for LTE-NR Tight Interworking. As shown in FIG. 1, a user equipment (UE), is coupled to a master node and a secondary node, where the master node and the secondary node each have their own RRC entity. The UE 101 (UE 102) has a single RRC state machine that follows the RRC state of the master LTE eNB 103 (NR gNB 104). Each node generates RRC Protocol Data Unit (PDUs) and inter-node PDUs using Abstract Syntax Notation One (ASN.1). The RRC PDUs and inter-node PDUs generated by the secondary NR gNB 105 (LTE eNB 106) may be embedded into the RRC PDUs generated by the master LTE eNB 103 (NR gNB 104), and be transported through the master LTE eNB 103 (NR gNB 104) to the UE 101 (UE 102).

Figure 2:
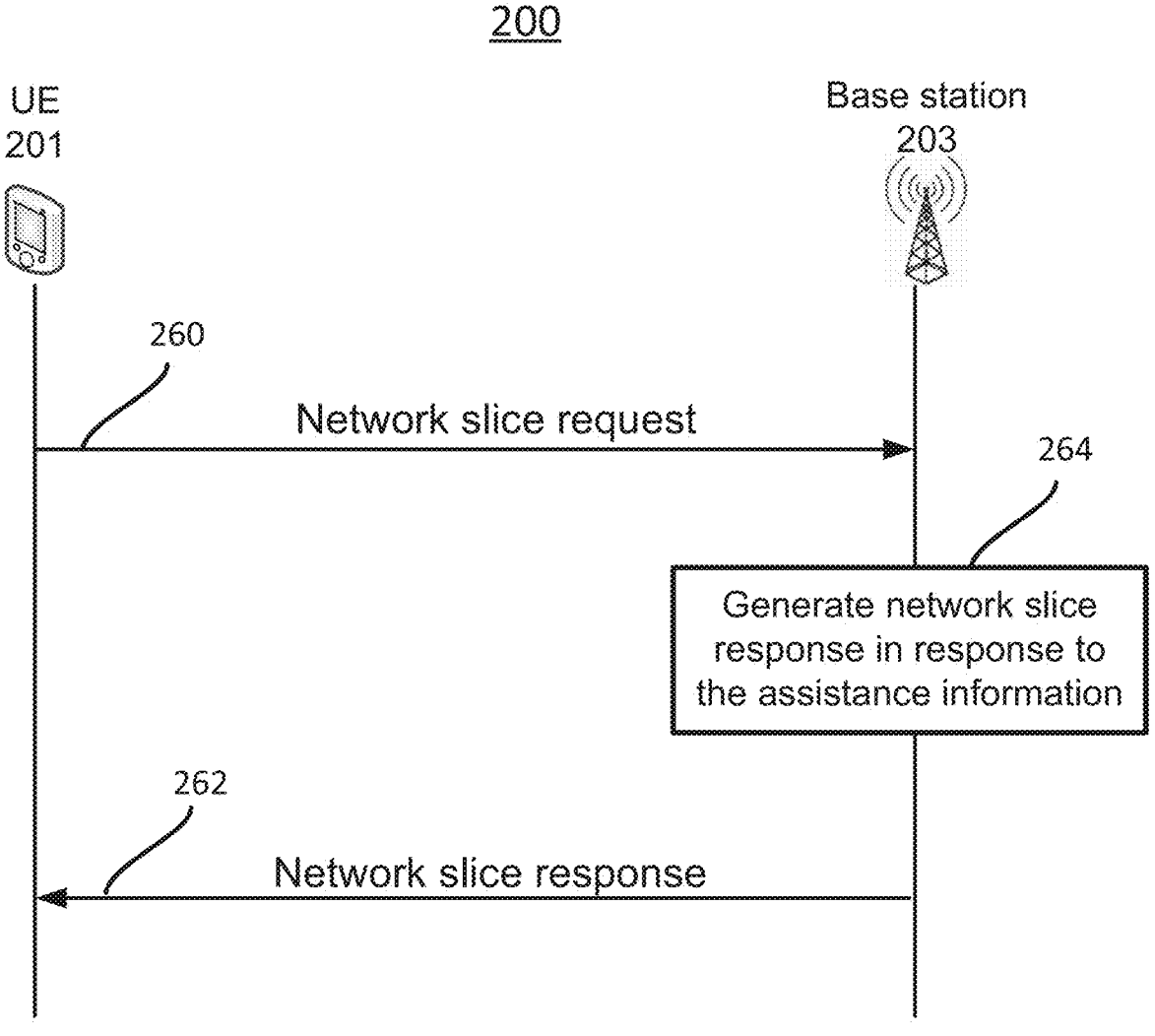
FIG. 2 is a diagram illustrating a wireless communication method for network slicing according an exemplary implementation of the present disclosure.

FIG. 2 is a diagram illustrating a wireless communication method for network slicing according to an exemplary implementation of the present disclosure. As shown in FIG. 2, a wireless communication system 200 includes a UE 201 and a base station 203. In step 260, the UE 201 sends a network slice request to the base station 203. The network slice request includes a UE ID and assistance information. In step 264, the base station 203 generates a network slice response in response to assistance information. The network slice response indicates whether the network slice request is supported by the base station 203. In step 262, the UE receives the network slice response from the base station 203.

In one embodiment, the network slice request is sent from the UE 201 to request a specific network slice service or a network slice configuration from the base station 203. The network slice request includes an ID for the UE (e.g., UE ID) and assistance information for network slice selection. The assistance information for network slice selection includes a network slice identity, a network slice type or network slice requirement. The UE ID may be used to reveal the UE identity.

When the network slice response indicates the network slice request can be supported, an RRC connection may be established between the UE 201 and the base station 203 directly to provide the requested network slice to the UE 201. When the network slice response indicates the network slice request cannot be supported, a mobility management procedure may be involved to couple to a suitable node capable of supporting the network slice request and providing the corresponding network slice service.

In some embodiments, the UE ID may be C-RNTI (Cell Radio Network Temporary Identity), Temporary C-RNTI, or Temp ID. In some embodiments, the UE ID may be I-RNTI (Inactive Radio Network Temporary Identity) for the UE in RRC INACTIVE state. In some embodiments, the UE ID may be RRC resume ID for the UE in light connected state.

Figure 3:
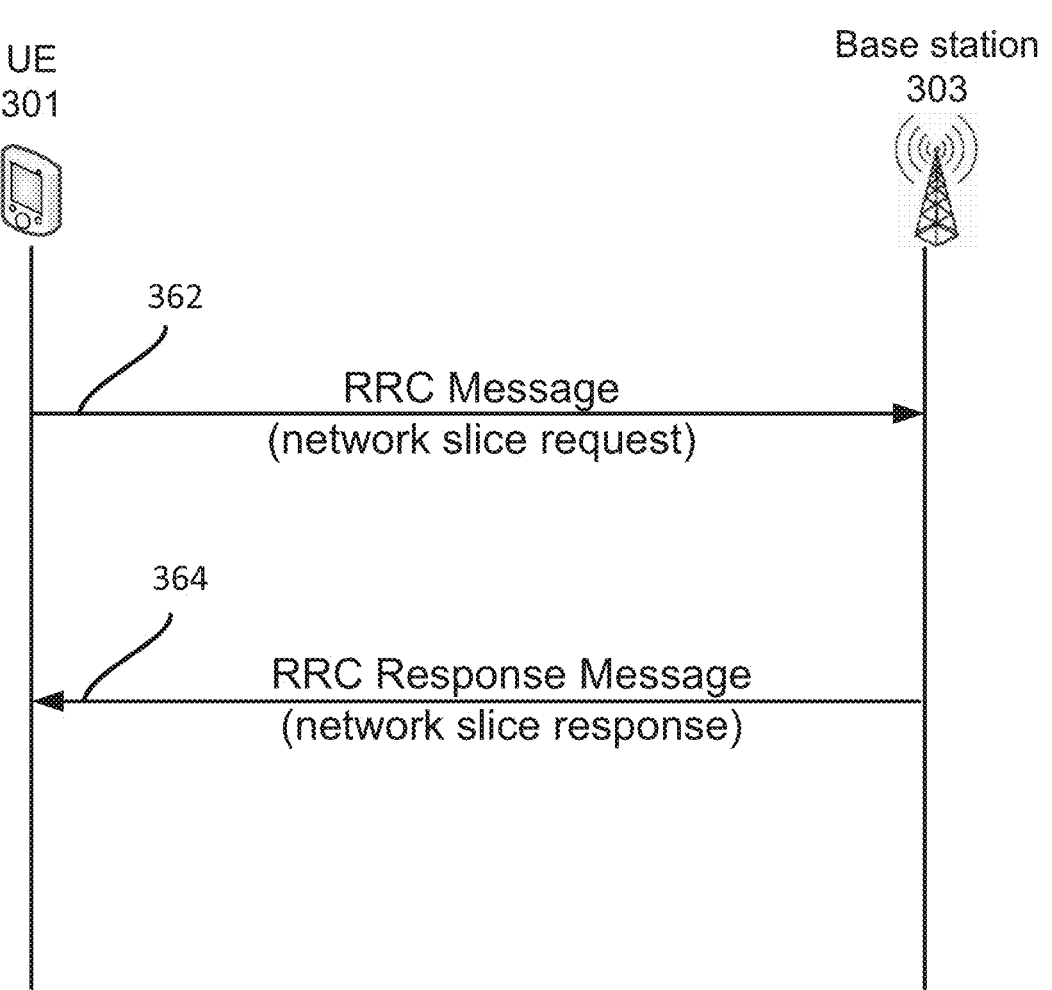
FIG. 3 is a diagram illustrating a wireless communication method for network slicing via RRC message according to another exemplary implementation of the present disclosure.

FIG. 3 is a diagram illustrating a wireless communication method for network slicing via RRC message according to another exemplary implementation of the present disclosure. As shown in FIG. 3, a wireless communication system 300 includes a UE 301 and a base station 303. In one embodiment, the base station 303 is an LTE eNB. In step 362, UE 301 sends a network slice request via an RRC Message 362 to the base station (e.g., LTE eNB) 303. The network slice request includes a UE ID and assistance information for network slice selection.

The assistance information for network slice selection includes a network slice identity, a network slice type or network slice requirement. The network slice identity may be used to directly identify the exact network slice and required service. In one embodiment, the network slice identity includes a slice ID. In another embodiment, the network slice identity includes a network slice selection assistance information (NSSAI) or a single network slice selection assistance information (S-NSSAI). The network slice type identifies the type of requested network slice. In one embodiment, the network slice type includes network slice type ID (NeS-ID). In another embodiment, the network slice type includes the slice bitmap. For example, the Slice Bitmap may include preconfigured N bits (e.g., N supportable network slices/service), with a bit "1" meaning the corresponding network slice/service is supported and a bit "0" meaning the corresponding network slice/service is not supported. In one embodiment, the network slice requirement includes a network slice indication (e.g., NSIndication) to indicate the configuration of the requested network slice.

The base station 303 may be configured as a master node interworking with a secondary node under EUTRA NR Dual Connectivity (EN-DC) before receiving the RRC Message or may merely be configured as an individual node without interworking before receiving the RRC Message. The RRC Message may be RRCMessageforRequest, RRCConnectionRequest, RRCResumeRequest or RRCConnectionReestablishmentRequest.

In some embodiments, the RRC Message may include network slice request corresponding to the network slice operation in Non-Access Stratum (NAS) layer.

As illustrated in FIG. 3, in step 364, in response to reception of the assistance information sent via the RRC Message 362, the base station 303 responds a network slice response via an RRC Response Message to the UE 301.

In this embodiment, the core network (e.g., EPC) may not recognize or support the network slice request. For example, the core network (e.g., EPC) does not recognize the slice IDs or NSIndication. In another example, the base station 303 (e.g., LTE eNB) does not support the network slice capability. In yet another example, the base station 303 (e.g., LTE eNB) may recognize the network slice request but cannot provide the configurations in support of the requested network slice. In yet another example, the base station 303 (e.g., LTE eNB) may try to find a suitable node (e.g., NR gNB or ng-eNB) for the network slice but unsuccessful. In yet another example, the UE 301 may not be configured with LTE-NR interworking so that the base station 303 cannot forward the network slice request in the RRC Message 362 to a suitable NR gNB as the secondary node for network slice request. In these situations, the RRC Response Message rejects the network slice request without any additional information. The network slice response is included in the RRC Response Message indicating that the network slice request is not supported. In one embodiment, the cause of the rejection (e.g., no network slice support) may be included in the RRC Response Message.

The RRC Response Message may be RRCMessageforRejection, RRCConnectionReestablishmentReject, RRCResumeReject RRCConnectionReject, or RRCConnectionRelease.

After receiving the RRC Response Message 364, which indicating the current master node can't support the corresponding slicing, the UE 301 performs a handover to another node supporting the required network slice. In another embodiment, the UE 301 performs an inter-MeNB handover without a change of a secondary node under LTE-NR tight interworking. In some embodiments, the configuration of the handover may be transmitted to the UE 301 via the RRC Response Message 364.

In some embodiments, after receiving the RRC Response Message (e.g., RRCMessageforRejection) from the base station 303, the UE 301 may release the RRC connection with the base station 303, and perform cell (re) selection procedure to camp on another base station which supports the UE's required network slice.

Figure 4:
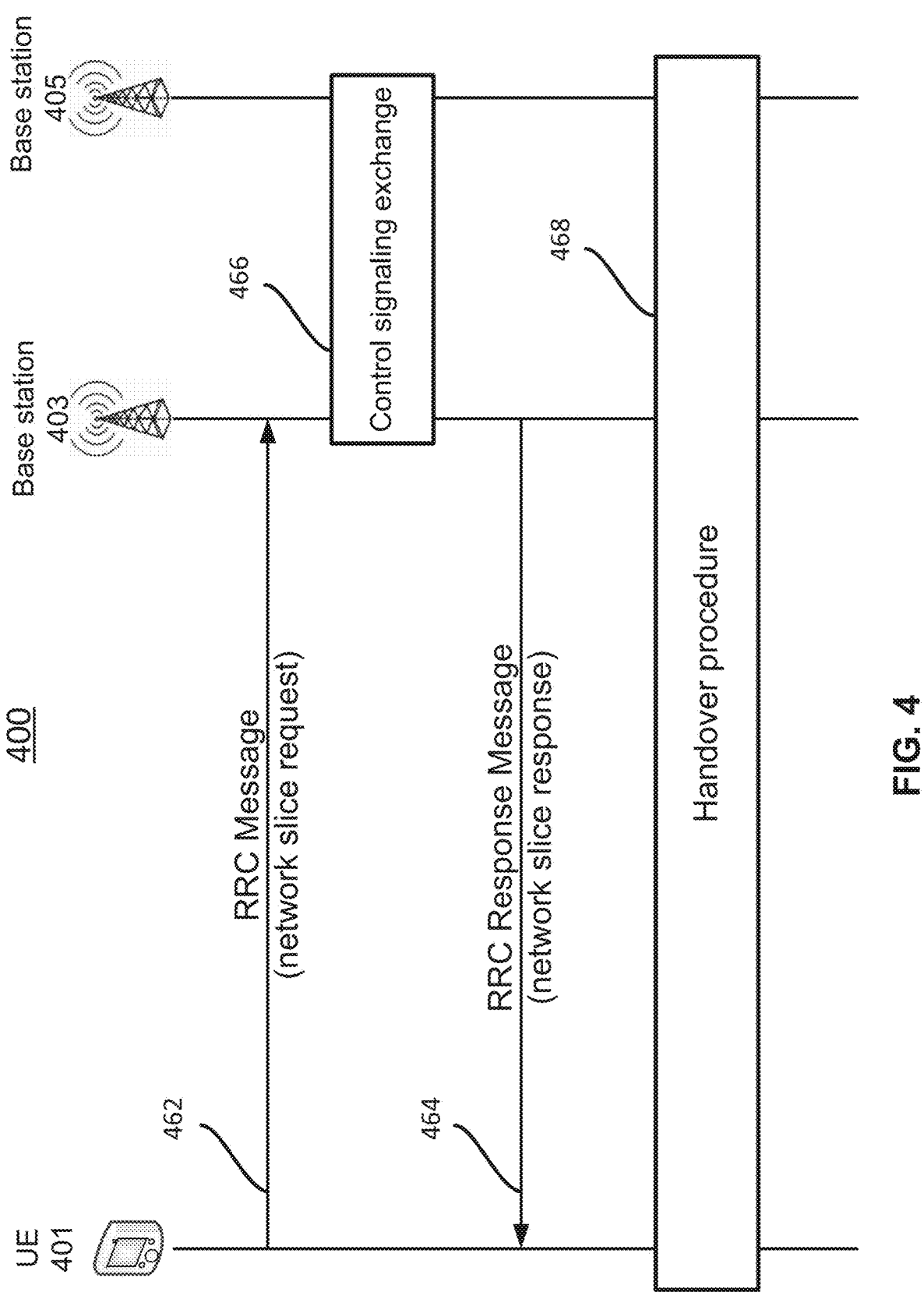
FIG. 4 is a diagram illustrating a wireless communication method for network slicing with handover procedure according to yet another exemplary implementation of the present disclosure.

FIG. 4 is a diagram illustrating a wireless communication method for network slicing with handover procedure according to yet another exemplary implementation of the present disclosure. As shown in FIG. 4, a wireless communication system 400 includes a UE 401 and a base station 403. In one embodiment, the base station 403 is an LTE eNB. In step 462, the UE 401 sends a network slice request via an RRC Message (e.g., RRCMessageforRequest) to the base station 403 (e.g., LTE eNB). The network slice request includes a UE ID and assistance information for network slice selection. The base station 403 may be configured as a master node interworking with a secondary node under EN-DC before receiving the RRC Message or may merely be configured as an individual node without interworking before receiving the RRC Message.

Once the base station 403 receives the RRC Message including the assistance information, which indicates the network slice requirement or the network slice service type, the base station 403 exchanges control signaling with other base stations via Xx/Xn interface in step 466. In one embodiment, the control signaling includes the assistance information. In another embodiment, the control signaling includes the UE ID. In yet another embodiment, the control signaling includes the target-node-selection information such as a suitable node ID (e.g., a suitable NR gNB ID, LTE eNB ID, ng-eNB ID), a list of suitable node IDs, a suitable NR beam ID, a list of suitable NR beam IDs, a specific preamble of suitable node, a target NR Synchronization Signal (SS) block configuration, a list of target NR SS block configurations. The base station 403 may select a suitable base station supporting the network slice request from the other base stations (e.g., base station 405) in response to the control signaling of the other base stations.

In step 464, the base station 403 responds an RRC Response Message (e.g., RRCmessageforRejection) including the network slice response to the UE 401 with additional information regarding suitable base station(s) (e.g., NR gNB(s) or ng-eNBs(s)) supporting the network slice request and the corresponding network slice service. For example, the additional information includes a target-node-selection information and relative resource configuration information.

In step 468, upon receiving the RRC Response Message, the UE 401 performs a handover to the selected node which supports the requested network slice. In another embodiment, the UE 401 performs an inter-MeNB handover without changing the secondary node. In some embodiments, the UE 401 releases the RRC connection to the base station (e.g., LTE eNB) 403 and perform cell (re) selection to select a target node.

Figure 5:
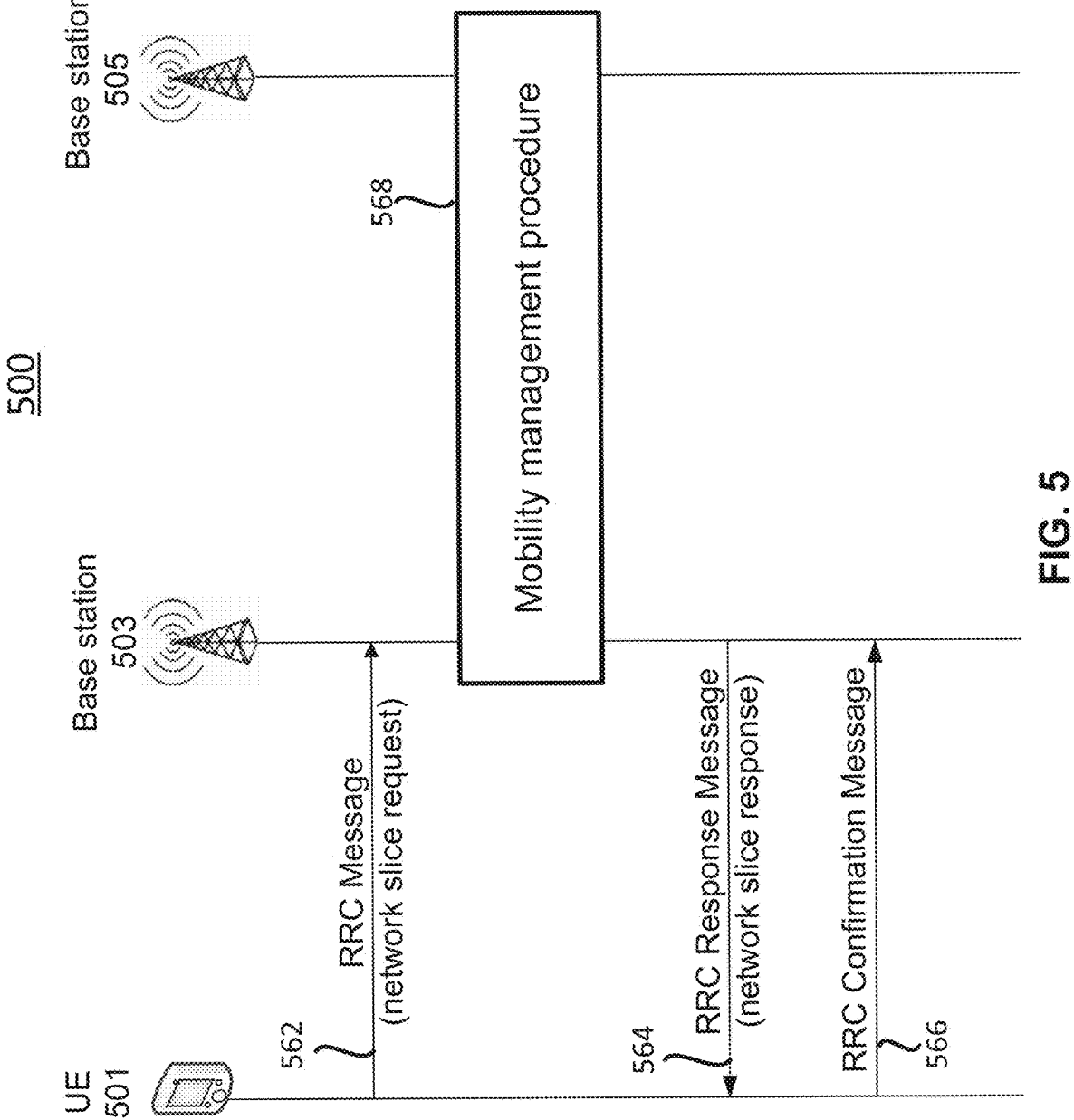
FIG. 5 is a diagram illustrating a wireless communication method for network slicing with mobility management procedure according to an exemplary implementation of the present disclosure.

FIG. 5 is a diagram illustrating a wireless communication method for network slicing with mobility management procedure according to yet another exemplary implementation of the present disclosure. As shown in FIG. 5, a wireless communication system 500 includes a UE 501, base station 503 and base station 505. In one embodiment, the base station 503 is an LTE eNB and the base station 505 is an NR gNB. In step 562, the UE 501 slice request via an RRC Message (e.g., RRCMessageforRequest) to the base station

503. The network slice request includes a UE ID and assistance information for network slice selection.

In this embodiment, although the base station 503 and the EPC do not provide the network slice, the base station 503 may still establish the RRC connection to the UE 501. In this case, as shown in step 568, the base station 503 performs a mobility management procedure when the network slice request is not supported by the base station 503, but could be supported by a surrounding base station 505. In this embodiment, the mobility management procedure is a secondary cell group (SCG)-related procedure. In the SCG-related procedure, an RRC connection is established between the UE and at least one base station (e.g., a suitable NR gNB) which supports the requested network slice when the UE indicates a sufficient good link quality between the base station.

In one embodiment, the SCG-related procedure includes an SCG addition where a suitable secondary node (e.g., NR gNB) is added in RRC connection with the UE. The SCG addition procedure may involve a multi-connectivity configuration for the UE. In another embodiment, the SCG-related procedure includes an SCG modification where the current secondary node that is unable to provide the required network slice may be re-configured with capability of providing the required network slice. In yet another embodiment, the SCG-related procedure includes an SCG change where a secondary node handover is involved.

In some embodiments, the SCG-related mobility management procedure also includes beam-level operation. For example, a beam addition where an NR beam supporting required network slice is added, a beam modification where a serving NR beam is modified to support the required network slice, or a beam change where a serving NR beam is changed to a new beam supporting the required network slice.

An SCG-related mobility management procedure may be performed when the UE does not have RRC connection with a secondary node, or when the UE has RRC connection with a secondary node which does not support the required network slice service.

In the SCG-related mobility management procedure, the control signaling is exchanged between the base station 503 and the base station 505 via the Xx/Xn interface.

After the SCG-related mobility management procedure is performed, in step 564, the base station 503 sends an RRC Response Message (e.g., RRCMessageforReconfiguration, RRCConnectionReconfiguration, RRCReconfiguration) including the network slice response to the UE 501. The network slice response indicates that the RRC connection between the UE and the secondary node base station 505 is established. The RRC configuration message includes the related parameters for the UE to operate upon target base station.

After the UE 501 receives the RRC Response Message from the base station 503, in step 566, the UE 501 sends an RRC Confirmation Message to the base station 503. In one of the embodiments, the RRC Confirmation Message is a RRCMessageforCompleteReconfiguration, RRCConnectionReconfigurationComplete, RRCConnectionResumeComplete, or RRCConnectionSetupComplete.

Figure 6:
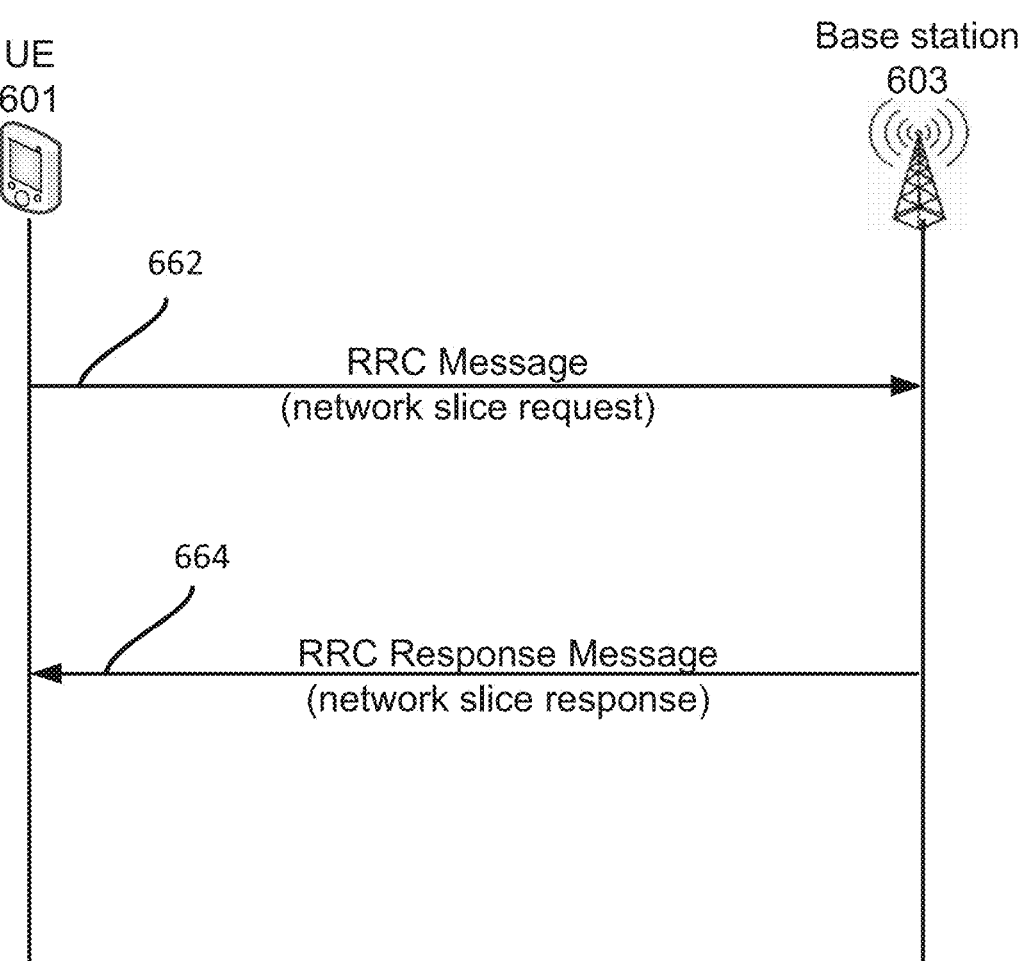
FIG. 6 is a diagram illustrating a wireless communication method for network slicing via RRC message according to an exemplary implementation of the present disclosure.

FIG. 6 is a diagram illustrating a wireless communication method for network slicing via RRC Message according to yet another exemplary implementation of the present disclosure. As shown in FIG. 6, a wireless communication system 600 includes a UE 601 and a base station 603. In one embodiment, the base station 603 is a NR gNB. In step 662, the UE 601 sends a network slice request via an RRC Message (e.g., RRCConnectionforRequest) to the base station 603. The network slice request includes a UE ID and assistance information for network slice selection.

As illustrated in FIG. 6, in step 664, the base station 603 responds a network slice response via an RRC Response Message to the UE 601.

In this embodiment, although the required network slice request is supported by the base station 603, the network slice request may be rejected by the base station 603. For example, the anchor base station 603 may not support the specific network slice service requested by the UE 601. For another example, under LTE-NR tight interworking, the base station 603 may be a secondary node that cannot support the specific network slice service. In these cases, in step 664, the base station 603 may reject the network slice request without any additional information. In some embodiment, the cause of the rejection (e.g., no network slice support) may be included in the RRC Response Message.

In some embodiments, the RRC Response Message may include additional information for assistance of network slice selection. For example, the additional information includes a suitable node ID (e.g., an NR gNB/cell ID, LTE eNB/cell ID, ng-eNB/cell ID, eLTE eNB/cell ID), a list of suitable node IDs (e.g., an NR gNB/cell IDs, LTE eNB/cell IDs, ng-eNB/cell IDs, eLTE eNB/cell IDs), a suitable gNB beam ID, a list of suitable gNB beam IDs, specific preamble of suitable node (e.g., NR gNB/cell, LTE eNB/cell and eLTEeNB/cell), target NR Synchronization Signal (SS) block configuration, a list of target NR SS block configurations. In some embodiments, the base station 603 exchanges control signaling with other base stations via Xx/Xn communication interface to obtain the additional information. The UE 601 may utilize the additional information to identify the suitable base station supporting the network slice request.

In some embodiments, the UE 601 performs a handover to another node (e.g., a suitable NR gNB that supports a network slice service indicated in the network slice request) after receiving the RRC Response Message. In some embodiments, the UE 601 may perform the SCG-related mobility management procedure described above after receiving the RRC response message. In some other embodiments, the UE 601 may release the RRC connection with the base station 603 and perform cell (re) selection procedure to camp on a target node which supports the UE's required network slice after receiving the RRC Response Message.

Figure 7:
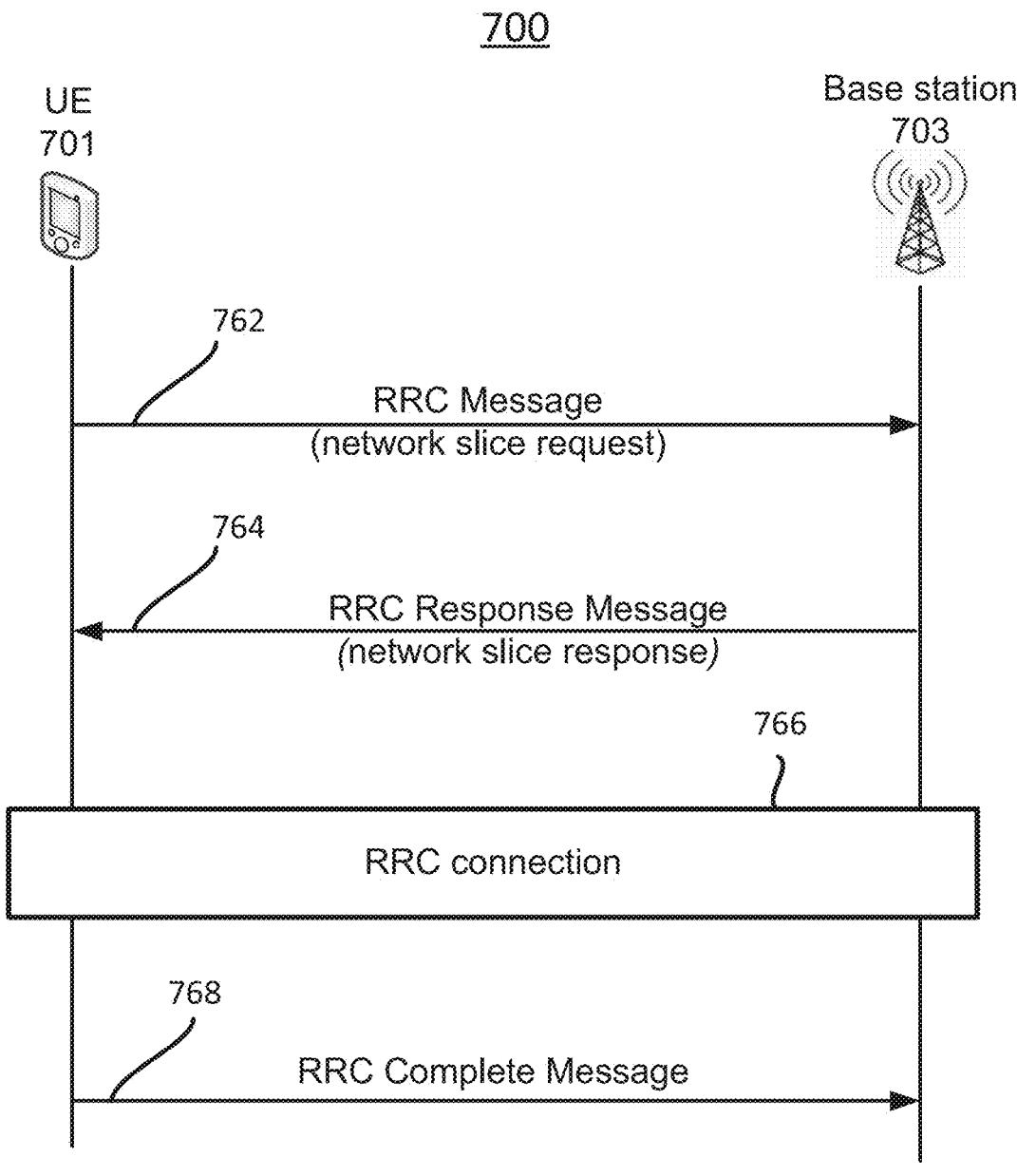
FIG. 7 is a diagram illustrating a wireless communication method for network slicing when the requested network slice service is supported, according to an exemplary implementation of the present disclosure.

FIG. 7 is a diagram illustrating a wireless communication method or network slicing when the requested network slice service is supported, according to yet another exemplary implementation of the present disclosure. As shown in FIG. 7, a wireless communication system includes a UE 701 and a base station 703. In one embodiment, the base station 703 is a NR gNB. The UE 701 sends a network slice request via an RRC Message (e.g., RRCMessageforRequest) to the base station 703. The network slice request includes a UE ID and assistance information for network slice selection.

In step 764, the base station 703 replies an RRC Response Message to the UE 701. In this embodiment, the base station 703 supports the requested network slice service, and the RRC Response Message is a RRCMessageforConnection-Setup, RRCMessageforReconfiguration, RCConnection-Setup or RRCConnectionReconfiguration.

Upon receiving the RRC Response Message, in step 766, the UE 701 establishes or re-configures an RRC connection with the base station 703.

In step 768, the UE sends an RRC Complete Message (e.g., RRCMessageforCompleteConnection, RRCConnectionComplete or RRCReconfigurationComplete) to show the acknowledgement of the requested network slice support between the UE 701 and the base station 703.

Figure 8:
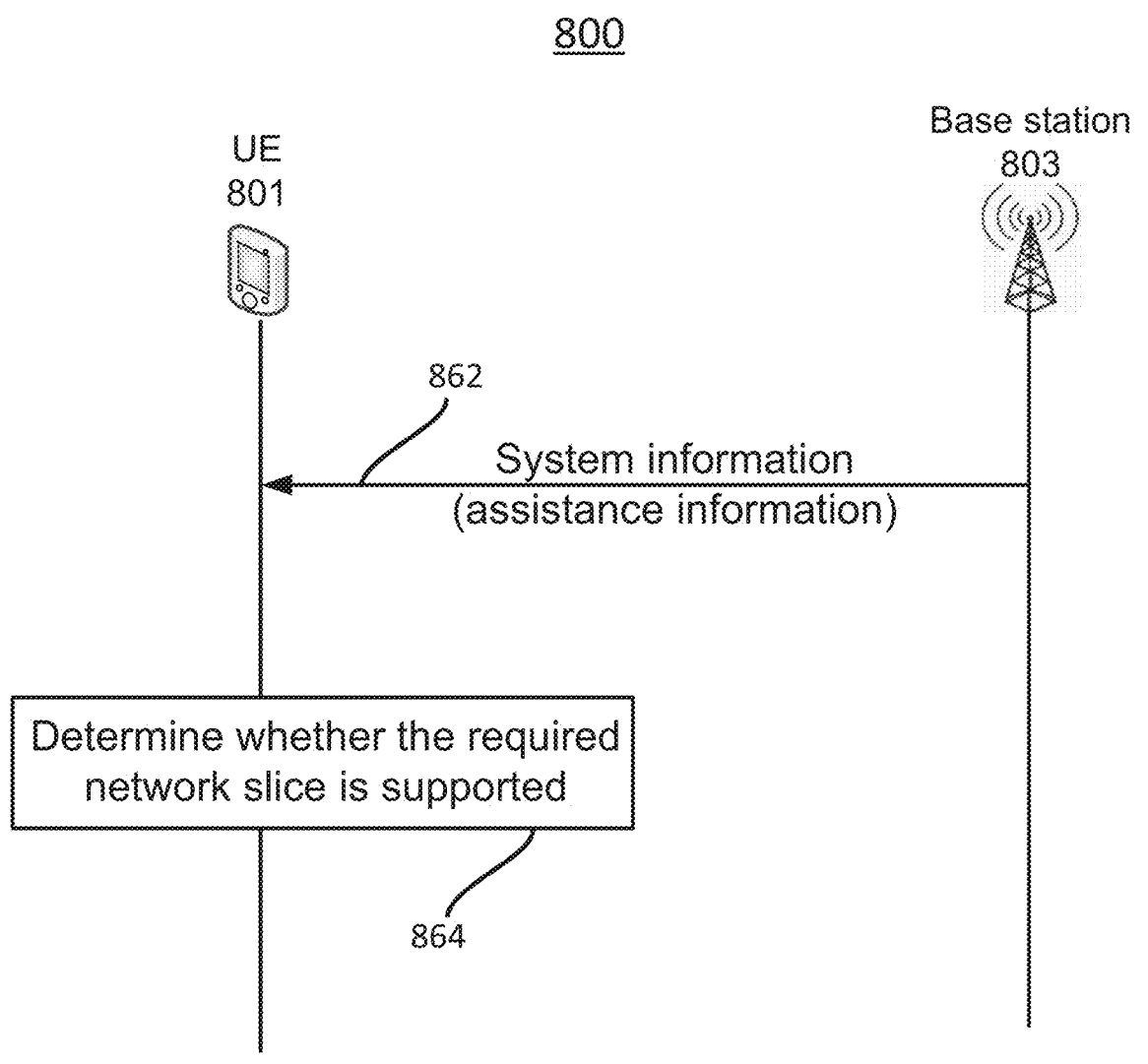
FIG. 8 is a diagram illustrating a wireless communication method for network slicing via system information, according to an exemplary implementation of the present disclosure.

FIG. 8 is a diagram illustrating a wireless communication method for network slicing via system information according to yet another exemplary implementation of the present disclosure. As shown in FIG. 8, a wireless communication system 800 includes a UE 801 and a base station 803. In one embodiment, the base station 803 is a NR gNB. In step 862, the base station 803 broadcasts System information (SI) to the UE 801. In one embodiment, SI includes only the minimum SI. The minimum SI includes assistance information for network slice selection. The assistance information for network slice selection includes a Slice ID, NeS-ID, S-NSSAI, NSIndication, or Slice Bitmap to indicate the network slice supported by the base station 803.

In the case that the assistance information (e.g., Slice ID) is broadcasted, the base station 803 informs a group of UEs (including the UE 801) of the Slice ID of the supported network slice. After the SI is received, in step 864, the UE 801 may determine whether the network slice to be requested can be supported by the base station 803 according to the assistance information (e.g., supportable Slice ID).

In the case that the assistance information (e.g., NSIndication) is broadcasted, the network slice capability of the base station 803 is revealed, and the UE 801 may send a dedicated request to the base station 803 to request for the detail information about the exact network slice service supported by the base station 803.

Figure 9:
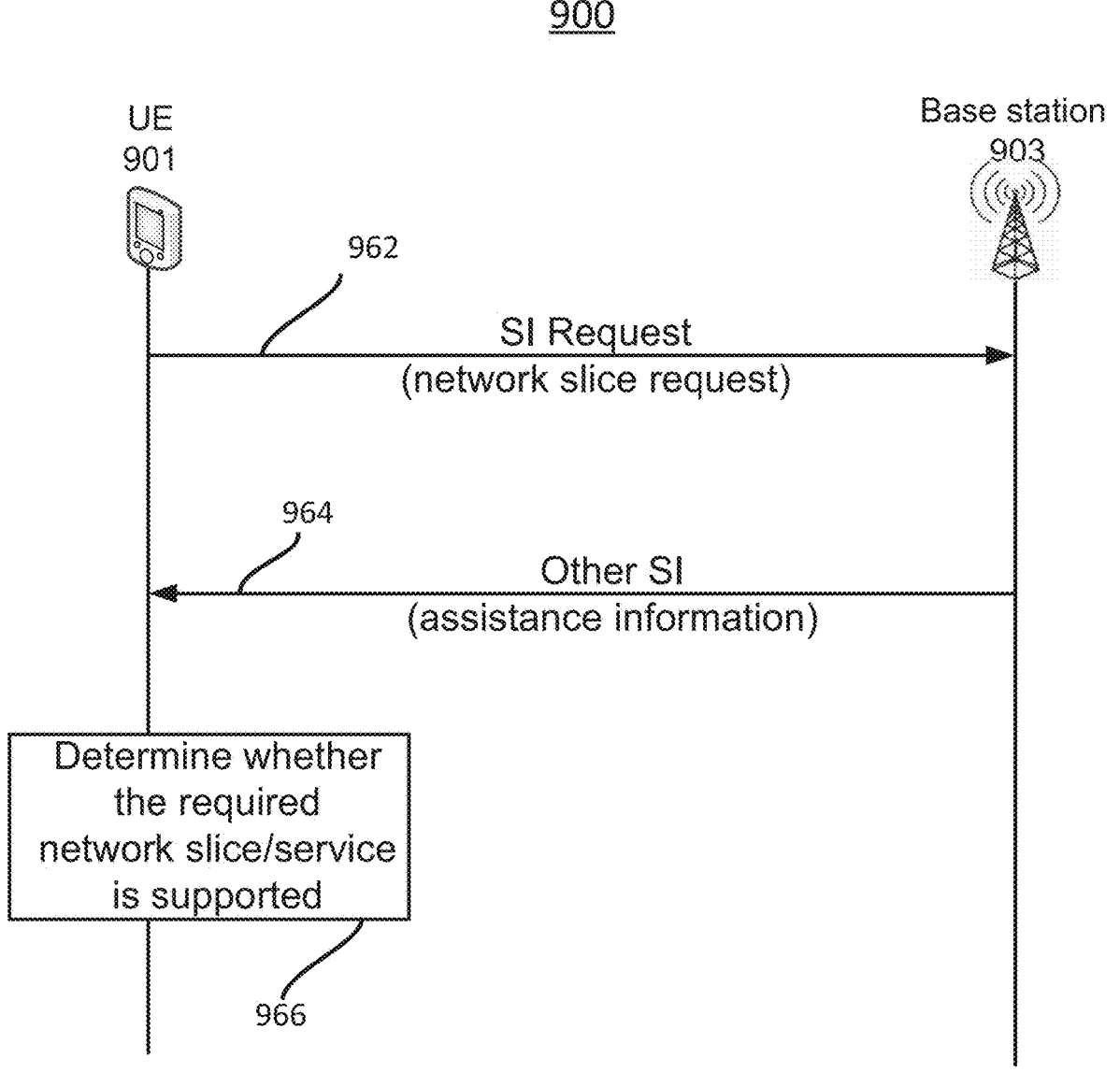
FIG. 9 is a diagram illustrating a wireless communication method for network slicing via system information request, according to an exemplary implementation of the present disclosure.

FIG. 9 is a diagram illustrating a wireless communication method for network slicing via system information request, according to yet another exemplary implementation of the present disclosure. As shown in FIG. 9, a wireless communication system 900 includes a UE 901 and a base station 903. In one embodiment, the base station 903 is a NR gNB. In step 962, the UE 901 sends a system information request (SI Request) including the network slice request to the base station 903. The network slice request includes a UE ID and assistance information for network slice selection. In this embodiment, the system information request includes other SI (e.g., on demand SI) and assistance information (e.g., NSIndication). In one embodiment, the SI request is used to acquire more system information regarding the details of network slice supportability of the base station 903.

In step 964, the base station 903 replies the UE 901 with the Other SI including assistance information for network slice selection. For example, the assistance information includes the exact supported identities of network slice (e.g., Slice IDs, S-NSSAI), the supported network slice type (e.g., NeS-ID, Slice Bitmap), or the supported network slice requirement (e.g., NSIndication).

In step 966, the UE 901 determines whether a network slice to be requested can be supported by the base station 903.

In some embodiments, in step 964, the base station 903 also replies the network slice capability of the other base stations or the network slice supported by the other base stations to the UE 901 so that the UE 901 determines whether of the network slice request is supported by the other base stations. When there is a base station supporting the network slice request, the UE 901 performs a mobility management procedure to connect with the base station supporting the network slice request.

In some embodiments, a UE would connect with other base station(s) that supports a network slice request when the network slice requested by the UE is not supported by the base station. In such cases, a mobility management procedure is triggered by either UE, the anchor node or an interworking secondary node. The mobility management procedure may involve the control signaling exchange via Xx/Xn interface.

In some embodiments, a UE may perform a handover from the serving master node to other master node without changing the secondary node. The UE may perform measurements on some base stations supporting the network slice (e.g., NR gNB, ng-eNB). In one embodiment, the base stations supporting the network slice may be provided by the serving base station. In another embodiment, the base stations supporting the network slice are provided by other secondary base stations. In some other embodiments, the base stations supporting the network slice is pre-configured to the UE. For example, the base stations supporting the network slice is pre-configured to the UE according to the frequency band supporting the requested network slice.

In one embodiment, the UE may select a target base station according to the measurement result and report the decision to the serving base station. In some embodiments, the UE reports the measurement result to the serving base station and the serving base station decides the target base station to be connected. In some embodiments, the control signaling exchange is performed via the Xx/Xn interface among the NR gNB, the target master node and the target secondary node (if needed). Afterwards, the corresponding RRC message exchange between the UE and the NR gNB or between the UE and the target node is performed.

In some embodiments, the UE may perform a secondary node change by reselecting a secondary node supporting the requested network slice service. The secondary node is re-selected by the UE or by the serving base station based on the measurement result.

In some embodiments, the UE may perform a secondary node addition by adding a new secondary node supporting the requested network slice service. The added secondary node is selected by the UE, by the serving base station or by the existing secondary node based on the measurement result.

Figure 10:
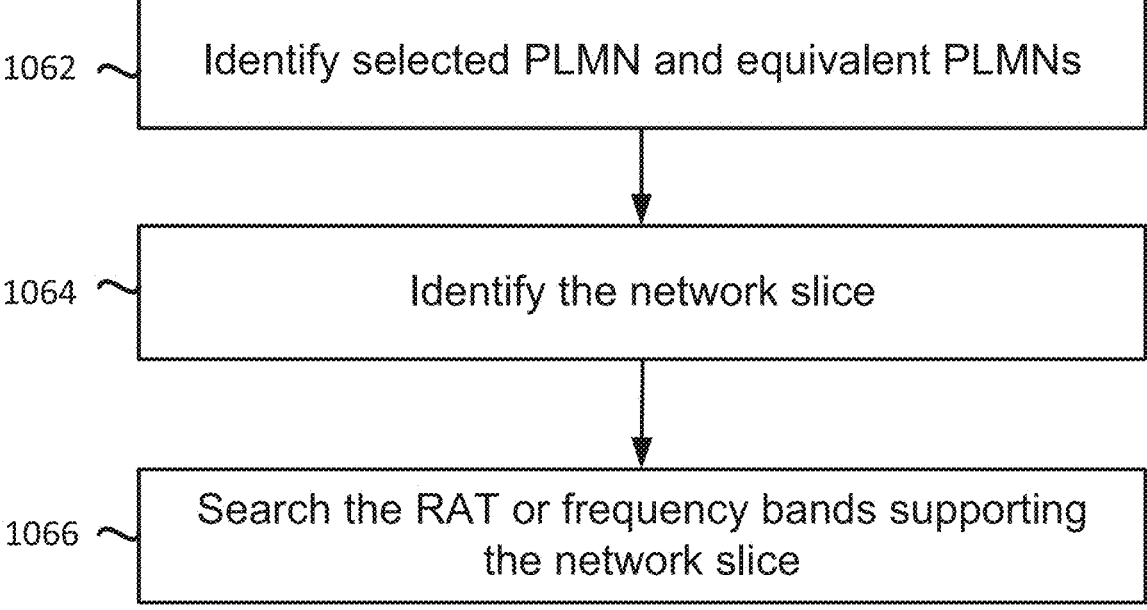
FIG. 10 is a diagram illustrating a flowchart of a cell (re) selection procedure in response to network slicing, according to an exemplary implementation of the present disclosure.

FIG. 10 shows a flowchart of a cell (re) selection procedure in response to network slicing, according to an exemplary implementation of the present disclosure. In this embodiment, the UE may camp or (re) select the base station having an appropriate RAT capable of supporting the required network slice service. As illustrated in FIG. 10, in step 1062, a selected Public Land Mobility Network (PLMN) and equivalent PLMNs are identified by a non-access stratum (NAS) layer of a UE. In step 1064, the required network slice service is identified by the NAS or AS layer of a UE. For example, the required network slice service is identified according to Slice ID, NeS-ID, S-NS-SAI, NSIndication or slice bitmap.

In step 1066, the RATs or frequency bands supporting the requested network slice service is searched by the UE. In one embodiment, the NAS layer of the UE is pre-configured with information regarding the RAT supporting the network slice, or information regarding the frequency band supporting the network slices, or information regarding a specific network slice service. Afterwards, based on the NAS layer's decision, the UE monitors and measures signals of the corresponding RATs or frequency bands supporting the network slice from the selected PLMN or equivalent PLMNs accordingly.

In some other embodiments, the NAS layer of the UE may forward the slicing information to AS, and the AS decides how to monitor and measure signals of the corresponding RATs or frequency bands supporting the network slice from the selected PLMN or equivalent PLMN based on AS's decision.

In some other embodiments, a UE may be (pre) configured with a list of barred cells which cannot support network slice. This list of barred cells may be pre-configured or updated when the UE receives the information regarding network slice request broadcasted from the serving base stations. The suitable cell to be camped can be identified based on the list of barred cells after the UE determines the PLMNs and performs the measurements.

Figure 11:
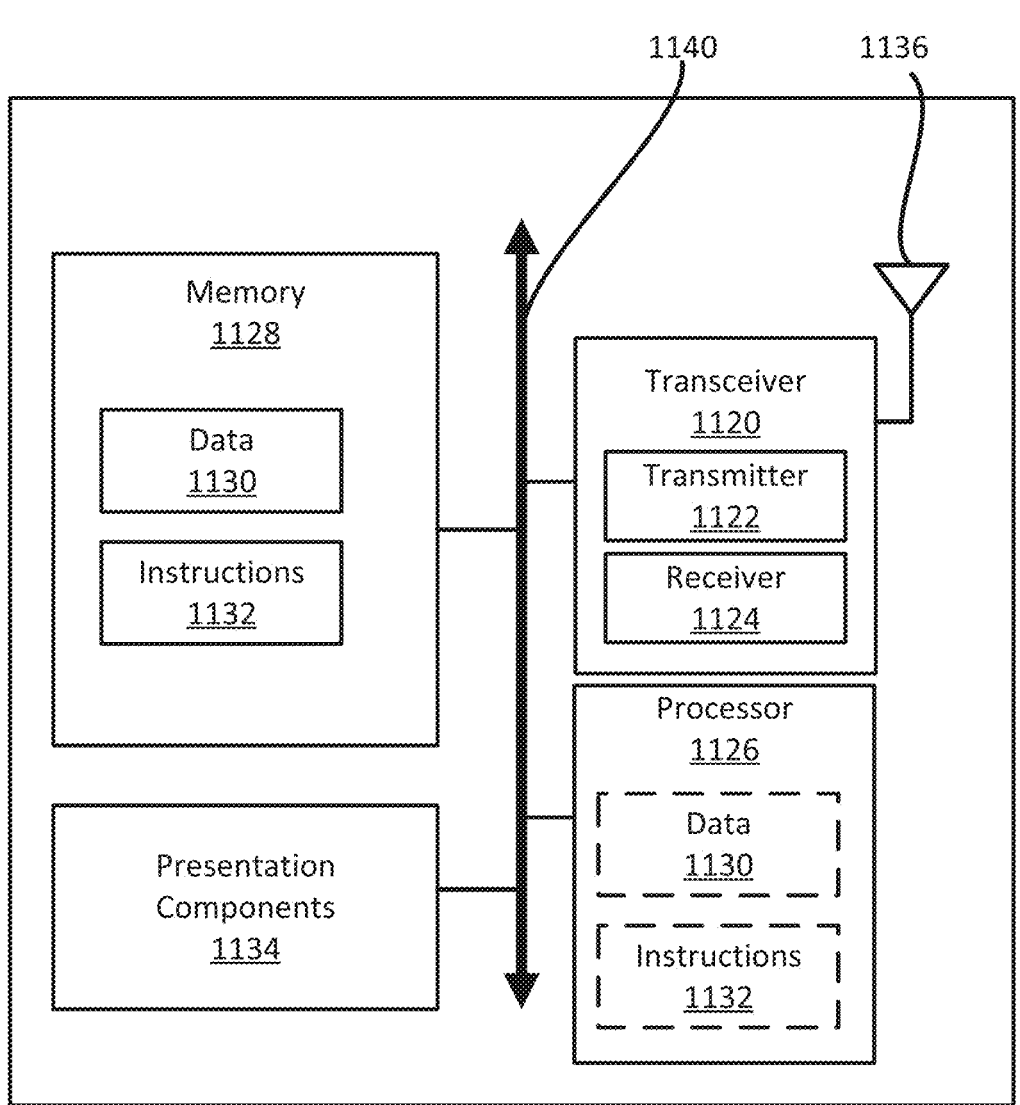
FIG. 11 is a block diagram illustrating a device for wireless communication, in accordance with various aspects of the present disclosure.

FIG. 11 illustrates a block diagram of a device for wireless communication, in accordance with various aspects of the present disclosure. As shown in FIG. 11, device 1100 may include transceiver 1120, processor 1126, memory 1128, one or more presentation components 1134, and at least one antenna 1136. Device 1100 may also include an RF spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140.

Transceiver 1120 having transmitter 1122 and receiver 1124 may be configured to transmit and/or receive time and/or frequency resource partitioning information. In some implementations, transceiver 1120 may be configured to transmit in different types of subframes and slots including, but not limited to, usable, non-usable and flexibly usable subframes and slot formats. Transceiver 1120 may be configured to receive data and control channels.

Device 1100 may include a variety of computer-readable media. Computer-readable media can be any available media that can be accessed by device 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1128 may include computer-storage media in the form of volatile and/or non-volatile memory. Memory 1128 may be removable, non-removable, or a combination thereof. Exemplary memory includes solid-state memory, hard drives, optical-disc drives, etc. As illustrated in FIG. 11, memory 1128 may store computer-readable, computer-executable instructions 1132 (e.g., software codes) that are configured to, when executed, cause processor 1126 to perform various functions described herein, for example, with reference to FIGS. 1 through 10. Alternatively, instructions 1132 may not be directly executable by processor 1126 but be configured to cause device 1100 (e.g., when compiled and executed) to perform various functions described herein.

Processor 1126 may include an intelligent hardware device, e.g., a central processing unit (CPU), a microcontroller, an Application Specific Integrated Circuit (ASIC), etc. Processor 1126 may include memory. Processor 1126 may process data 1130 and instructions 1132 received from memory 1128, and information through transceiver 1120, the base band communications module, and/or the network communications module. Processor 1126 may also process information to be sent to transceiver 1120 for transmission through antenna 1136, to the network communications module for transmission to a core network.

One or more presentation components 1134 presents data indications to a person or other device. Exemplary one or more presentation components 1134 include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A wireless communication method performed by a user equipment (UE), the wireless communication method comprising:

transmitting, to a first base station, a radio resource control (RRC) message indicating a requested network slice, the RRC message including a UE identifier (ID) and single network slice selection assistance information (S-NSSAI);

receiving, from the first base station, a network slice response indicating the requested network slice is rejected and a cause of the rejection;

establishing a first RRC connection with the first base station in response to receiving the network slice response; and establishing a second RRC connection with a second base station as a secondary node while maintaining the first RRC connection with the first base station after determining that the second base station does not support the requested network slice, wherein the UE has no RRC connection with a base station that supports the requested network slice after establishing the first RRC connection.

2. The wireless communication method of claim 1, wherein the network slice response is generated by an Access and Mobility Management Function (AMF) performed by the first base station in response to receiving the S-NSSAI.

3. The wireless communication method of claim 1, further comprising:

performing a mobility management procedure to connect with a third base station that supports the requested network slice.

4. A user equipment (UE), comprising:

at least one processor; and at least one non-transitory computer-readable medium coupled to the at least one processor and storing computer-executable instructions that, when executed by the at least one processor, cause the UE to:

transmit, to a first base station, a radio resource control (RRC) message indicating a requested network slice, the RRC message including a UE identifier (ID) and single network slice selection assistance information (S-NSSAI);

receive, from the first base station, a network slice response indicating the requested network slice is rejected and a cause of the rejection;

establish a first RRC connection with the first base station in response to receiving the network slice response; and establish a second RRC connection with a second base station as a secondary node while maintaining the first RRC connection with the first base station after determining that the second base station does not support the requested network slice, wherein the UE has no RRC connection with a base station that supports the requested network slice after establishing the first RRC connection.

5. The UE of claim 4, wherein the network slice response is generated by an Access and Mobility Management Function (AMF) performed by the first base station in response to receiving the S-NSSAI.

6. The UE of claim 4, wherein the computer-executable instructions, when executed by the at least one processor, further cause the UE to perform a mobility management procedure to connect with a third base station that supports the requested network slice.

7. A wireless communication method performed by a first base station, the wireless communication method comprising:

receiving, from a user equipment (UE), a radio resource control (RRC) message indicating a requested network slice, the RRC message including a UE identifier (ID) and single network slice selection assistance information (S-NSSAI);

transmitting, to the UE, a network slice response indicating the requested network slice is rejected and a cause of the rejection; and establishing a first RRC connection between the first base station and the UE, wherein:

the UE establishes a second RRC connection with a second base station as a secondary node while maintaining the first RRC connection with the first base station after determining that the second base station does not support the requested network slice, and the UE has no RRC connection with a base station that supports the requested network slice after establishing the first RRC connection.

8. The wireless communication method of claim 7, wherein the network slice response is generated by an Access and Mobility Management Function (AMF) performed by the first base station in response to receiving the S-NSSAI.

9. The wireless communication method of claim 7, further comprising:

selecting a third base station that supports the requested network slice based on the S-NSSAI; and performing a mobility management procedure to connect with the third base station.

10. The wireless communication method of claim 9, further comprising:

exchanging, with the third base station, control signaling, the control signaling including the S-NSSAI.

11. The wireless communication method of claim 10, wherein the control signaling further includes beam information of the third base station.

\* \* \* \* \*